United States Patent Office 3,293,284
Patented Dec. 20, 1966

3,293,284
1,2-SECO-A-NOR-5 ALPHA - ANDROSTANE - 1,2,17 BETA-TRIOLS, 17-ALKYLATED-1,2-SECO-A-NOR-5 ALPHA - ANDROSTANE - 1,2,17 BETA - TRIOLS AND ESTERS THEREOF
Raphael Pappo, Skokie, and Christopher Jung, Morton Grove, Ill., assignors to G. D. Searle & Co., Chicago, Ill., a corporation of Delaware
No Drawing. Filed Aug. 7, 1964, Ser. No. 388,278
8 Claims. (Cl. 260—488)

The present invention relates to novel 1,2-seco-A-norsteroids and, more particularly, to the (optionally 17-alkylated - 1,2 - seco-A-nor-5α-androstane-1,2,17β-triols and esters corresponding represented by the structural formula

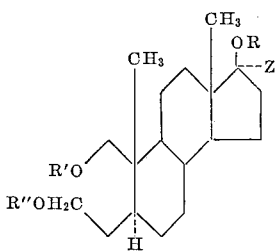

In that structural representation, Z can be hydrogen or a lower alkyl radical while R, R', and R'' are symbolic of hydrogen or a lower alkanoyl radical.

The term lower alkyl radical is defined as a group encompassed by the formula $$C_nH_{2n+1}$$

wherein $n$ is a positive integer less than 7, and is exemplified by methyl, ethyl, propyl, butyl, pentyl, hexyl, and the branched-chain isomers thereof. By the term lower alkanoyl is meant those acyl radicals derived from alkanoic acids of the formula (lower alkyl)—COOH wherein the term lower alkyl has the identical significance hereinbefore indicated.

Mehods suitable for the manufacture of the compounds of the present invention involve contacting a compound within the scope of the following structural formula

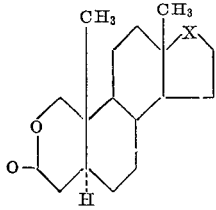

wherein X can be a carbonyl, β-hydroxymethylene or α-lower alkyl)-β-hydroxymethylene group, with a suitable reducing agent. Examples of suitable reagents are sodium borohydride, lithium aluminum hydride, and lithium tri-(tertiary-butoxy) aluminum hydride. Illustrative of the processes in question is the reaction of 17β-hydroxy-17α-methyl-2-oxa-5α-androstan-3-one in tetrahydrofuran with lithium aluminum hydride at the reflux temperature to yield 17α-methyl-1,2-seco-A-nor-5α - androstane - 1,2,17β-triol.

Equally suitable as starting materials in the manufacture of the instant compounds are the 1,2-seco-A-nor substances represented by the following structural formula

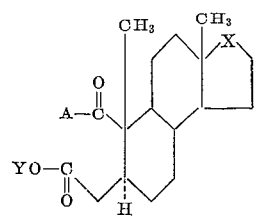

wherein X is a carbonyl, β-hydroxymethylene or α-(lower alkyl) - β - hydroxymethylene group, Y is hydrogen or a formyl or lower alkyl radical, and A can be hydrogen or a hydroxy group. These materials can be substituted for the 2-oxa-3-ones in the reduction processes described above. Thus, methyl 17β-hydroxy-17α-methyl-1-oxo-1,2-seco-A-nor-5α-androstan-2-oate in tetrahydrofuran is contacted with lithium aluminum hydride at the reflux temperature to afford the aforementioned 17α-methyl-1,2-seco-A-nor-5α-androstane-1,2,17β-triol.

The lower alkanoyl esters of the instant triols are conveniently obtained by reaction of the latter substances with a lower alkanoic acid anhydride or halide, preferably in the presence of a suitable acid acceptor such as pyridine, triethylamine, etc. The aforementioned 1,2-seco-A-nor-5α-androstane-1,2,17β-triol or 17α-methyl-1,2-seco - A - nor-5α-androstane-1,2,17β-triol, for example, is contacted with acetic anhydride and pyridine at room temperature to afford the corresponding 1,2,17-triacetate and 1,2-diacetate, respectively.

The compounds of the present invention exhibit valuable pharmacological properties. In particular, they are hormonal agents as is evidenced by their ability to promote nitrogen retention, thus demonstrating anabolic activity, and also their ability to produce the androgenic responses characteristic of the administration of known androgens such as testosterone propionate. In addition, these compounds are antiprotozoal agents as is demonstrated by their ability to inhibit the growth of such microorganisms as *Tetrahymena gelleii*.

The invention will appear more fully from the examples which follow. These examples are given by way of illustration only and are not to be construed as limiting the invention either in spirit or in scope. Temperatures are given in degrees centigrade (° C.) and quantities of materials in parts by weight unless otherwise noted.

*Example 1*

To a mixture of 3.5 parts of sodium borohydride, 44.4 parts of tetrahydrofuran, and 47.5 parts of diethylene glycol dimethyl ether is added, slowly with stirring at 0–5°, a slurry of 10 parts of 17β-hydroxy-2-oxa - 5α - androstan-3-one in 105 parts by volume of boron trifluoride etherate. Stirring is continued under nitrogen for about 4 hours, after which time water is added slowly, and the resulting aqueous mixture is extracted with benzene. The benzene layer is spearated, washed with 10% aqueous sodium hydroxide, and stripped of solvent at reduced pressure. To this residue is added sufficient ethanol and aqueous sodium hydroxide to effect solution, at which point the mixture becomes strongly alkaline. This mixture is heated on the steam bath for about 30 minutes, then is concentrated to a small volume at reduced pressure, and the resulting residue is extracted with benzene. The resulting organic layer is separated, washed with water, dried over anhydrous sodium sulfate and stripped of solvent at reduced pressure to afford 1,2-seco-A-nor-5α-androstane-1,2,17β-triol. Recrystallization of this material from acetone affords a pure sample, melting at about 181–182°. It is represented by the following structural formula

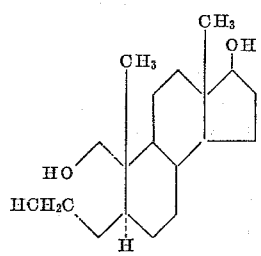

Example 2

To a solution of 15 parts of 17β-hydroxy-17α-methyl-2-oxa-5α-androstan-3-one in 1776 parts of tetrahydrofuran is added 15 parts of lithium aluminum hydride, and this reaction mixture is stirred at room temperature for about 16 hours, then is heated at the reflux temperature for about 2 hours. After cooling to approximately 0°, 16 parts of water followed by 12 parts by volume of 20% aqueous sodium hydroxide and 56 parts of water are consecutively added. The resulting inorganic salts which precipitate are removed by filtration, and the filtrate is concentrated to dryness at reduced pressure. Recrystallization from benzene of the resulting residue yields 17α-methyl-1,2-seco-A-nor-5α-androstane - 1,2,17β-triol, melting at about 145–146° and characterized further by the following structural formula

Example 3

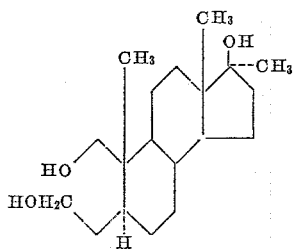

Example 3

By substituting an equivalent quantity of 17α-ethyl-17β-hydroxy-2-oxa-5α-androstan-3-one and otherwise proceeding according to the processes described in Example 2, 17α-ethyl-1,2-seco-A-nor-5α - androstane - 1,2,17β-triol is obtained.

Example 4

A mixture of 3 parts of 1,2-seco-A-nor-5α-androstane-1,2,17β-triol, 15 parts of acetic anhydride, and 30 parts of pyridine is allowed to stand at room temperature for about 16 hours, then is cooled to 0–5° and diluted carefully with water. The resulting aqueous mixture is extracted with benzene, and the organic layer is separated, washed successively with dilute hydrochloric acid, aqueous potassium bicarbonate and water, then dried over anhydrous sodium sulfate and stripped of solvent at reduced pressure. Crystallization of that crude product from benzene affords 1,2-seco-A-nor-5α-androstane - 1,2,17β-triol 1,2,17-triacetate, melting at about 137–139°. It can be represented by the following structural formula

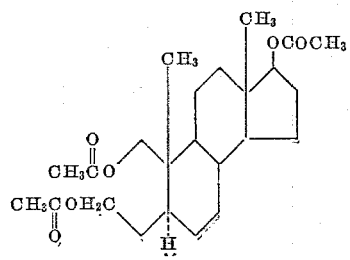

Example 5

The substitution of an equivalent quantity of butyric anhydride in the procedure of Example 4 results in 1,2-seco-A-nor-5α-androstane-1,2,17β-triol 1,2,17-tributyrate.

Example 6

To a solution of 10 parts of 17α-methyl-1,2-seco-A-nor-5α-androstane-1,2,17β-triol in 50 parts of pyridine is added 25 parts of acetic anhydride, and the resulting reaction mixture is stored at room temperature for about 16 hours. The reaction mixture is then diluted with ice and water, and the resulting aqueous mixture is extracted with chloroform. The organic layer is separated, washed successively with aqueous potassium bicarbonate and water, dried over anhydrous sodium sulfate and concentrated to dryness under reduced pressure. Crystallization of the residue from benzene results in pure 17α-methyl-1,2-seco-A-nor - 5α-androstane - 1,2,17β-triol 1,2-diacetate, melting at about 90–91° and represented by the following structural formula

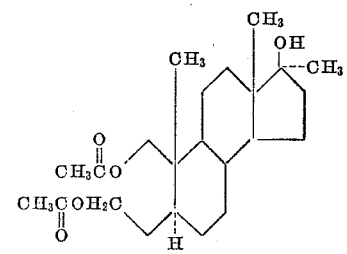

Example 7

By substituting an equivalent quantity of butyric anhydride and otherwise proceeding according to the procedure described in Example 6, 17α-methyl-1,2-seco-A-nor-5α-androstane-1,2,17β-triol 1,2-dibutyrate is obtained.

What is claimed is:
1. A compound of the formula

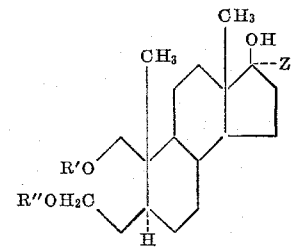

wherein Z is selected from the group consisting of hydrogen and a lower alkyl radical, R' and R'' are members of the class consisting of hydrogen and lower alkanoyl radicals, R is hydrogen when Z is an alkyl radical, and R is selected from the group consisting of hydrogen and a lower alkanoyl radical when Z is hydrogen.

2. 1,2-seco-A-nor-5α-androstane-1,2,17α-triol.
3. A compound of the formula

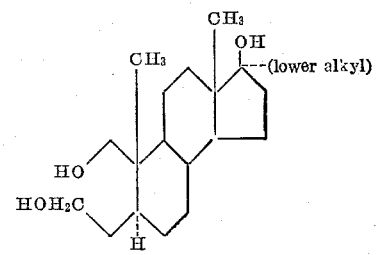

4. 17α-methyl - 1,2-seco-A-nor - 5α-androstane-1,2,17β-triol.
5. A compound of the formula
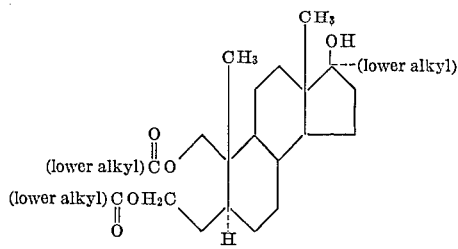
6. 17α-methyl - 1,2-seco-A-nor - 5α-androstane-1,2,17β-triol 1,2-diacetate.
7. A compound of the formula
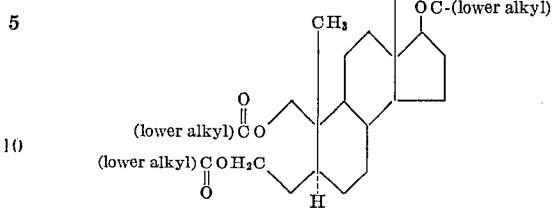
8. 1,2-seco-A-nor - 5α-androstane - 1,2,17β-triol 1,2,17-triacetate.
References Cited by the Examiner
UNITED STATES PATENTS
2,883,424  4/1959  Wildi _____ 260—488
LORRAINE A. WEINBERGER, *Primary Examiner.*
V. GARNER, *Assistant Examiner.*

UNITED STATES PATENT OFFICE
CERTIFICATE OF CORRECTION

Patent No. 3,293,284 December 20, 1966

Raphael Pappo et al.

It is hereby certified that error appears in the above numbered patent requiring correction and that the said Letters Patent should read as corrected below.

Column 1, line 61, for "α-lower alkyl)-" read -- α-(lower alkyl)- --; column 2, line 60, for "spearated" read -- separated --; column 3, lines 3 to 14, the left-hand portion of the formula should appear as shown below instead of as in the patent:

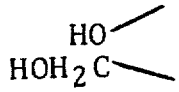

column 4, line 62, for "1,2,17α-" read -- 1,2,17β- --.

Signed and sealed this 28th day of November 1967.

(SEAL)
Attest:

EDWARD M. FLETCHER, JR.
Attesting Officer

EDWARD J. BRENNER
Commissioner of Patents